May 29, 1923.
I. M. SEMENOFF ET AL
1,456,519
SECTIONAL FENCE
Filed Aug. 16, 1922
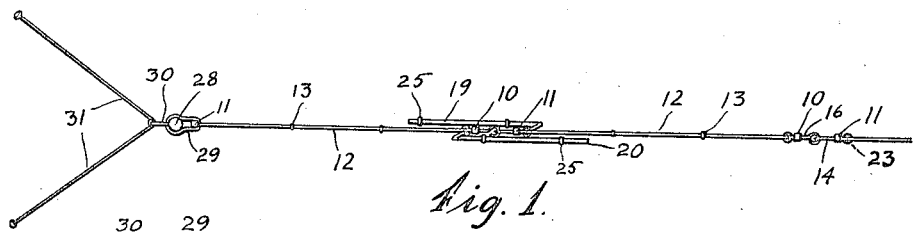
Fig. 1.
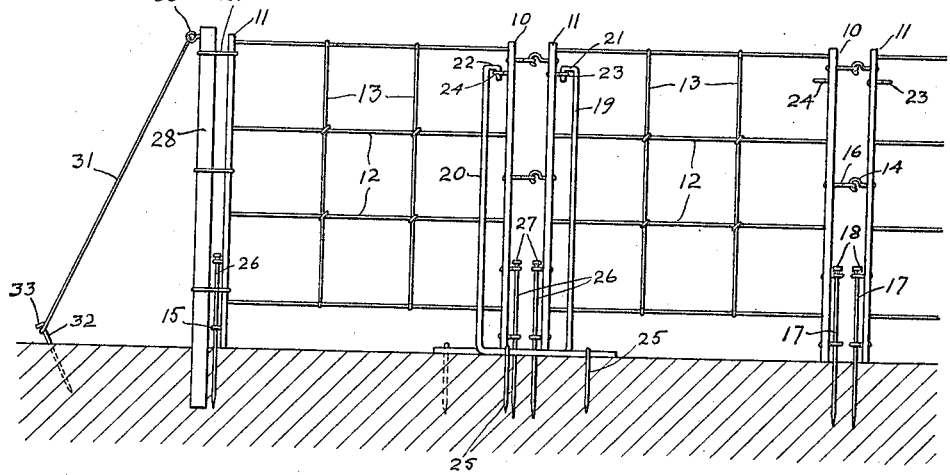
Fig. 2
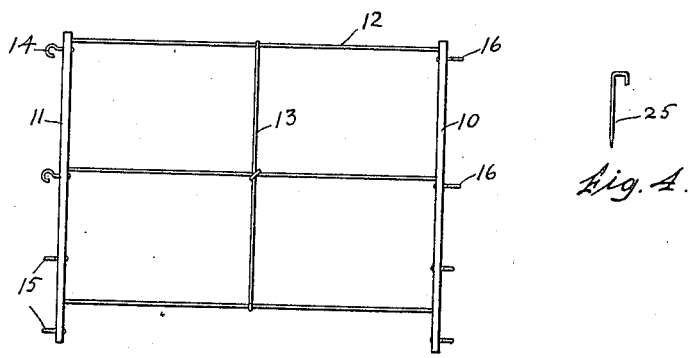
Fig. 3.
Fig. 4.
INVENTOR.
Ioakim M. Semenoff
Nykola Gurnicki
BY George C. Heinicke
ATTORNEY.

Patented May 29, 1923.

1,456,519

UNITED STATES PATENT OFFICE.

IOAKIM M. SEMENOFF AND NYKOLA GURNICKI, OF OSHAWA, ONTARIO, CANADA.

SECTIONAL FENCE.

Application filed August 16, 1922. Serial No. 582,154.

*To all whom it may concern:*

Be it known that I, IOAKIM M. SEMENOFF, a citizen of Russia, residing at Oshawa, Prov. of Ontario, and Dom. of Canada, and I, NYKOLA GURNICKI, a citizen of Canada, residing at Oshawa, Prov. of Ontario, and Dom. of Canada, have invented certain new and useful Improvements in Sectional Fences, of which the following is a specification.

This invention relates to improvements in fences and it is the principal object of the invention to provide a fence built in sections which can conveniently be transported and readily erected at any place.

Another object of the invention is the provision of a fence of this character which can be extended to any desired length and the sections of which are permitted a limited relative movement in order to allow for uneven ground etc.

A further object of the invention is the provision of a fence requiring only a very limited use of posts and which can be made of any style or type of wire effectively preventing animals from straying from a fenced in piece of pasture, etc.

Still further objects of the invention are the provision of means for connecting the single fence sections and of securely fastening the same to the ground.

These and other objects and advantages of our invention will become more fully known as the description thereof proceeds and will then be more specifically pointed out in the appended claims.

In the accompanying drawing, forming a material part of our invention:

Figure 1 is a front view of a sectional fence constructed and erected according to our invention.

Figure 2 is a detail front view of one of the fence sections.

Figure 3 shows in detail side view one of the fastening spikes.

Figure 4 is a side elevation of one of the clamping nails.

The single sections of our improved fence consist each of a pair of strong end bars 10 and 11 connected by wires 12 and cross wires 13 in the manner illustrated. Each bar 11 is provided with a plurality of upper and outer swivel hooks 14 mounted for limited movement and a pair of lower, outer eyes 15, while each bar 10 is equipped with a plurality of eyes 16.

While two adjusting bars 11 and 10 of neighboring sections are connected by means of the engagement of hooks 14 of one section with the eyes 16 of the other section, and are secured to the ground by spikes or long nails 17 passed through eyes 15 and 16 respectively as shown in Figure 1, and resting with their heads on the upper pair of eyes, it will become necessary at certain intervals, to use angle irons 19 and 20 respectively replacing the customary posts.

The upper ends of the vertical branches of these angle irons are hook shaped as at 21 and 22 respectively and engage eyes 23 and 24 secured to the inner faces of bars 11 and 10 respectively as clearly illustrated in Figure 1. The lower, horizontal branches of the angle irons 19 and 20 are engaging the ground, and clamping nails 25 are used to hold their branches to the ground, while spikes 26 provided with heads 27 are passed through eyes 16 and 15 of the sections into the ground.

Corner posts 28 are used at places where the fence changes its direction and clamps 29 are employed to connect the posts 28 with the bar 11 of the adjoining fence section.

To the outer faces of the corner posts, near their upper ends, eyes 30 are secured through which brace wires 31 are passed, the ends of which are held to the ground by means of pegs or nails 32 provided with heads 33.

The device operates as follows:

If it is desired to erect a fence at a predetermined place, the sections which may be transported to the place rolled, are spread and the lower bar 11 of one section is secured by means of the clamping wires 29 to the posts 28 previously driven into the ground, while a nail or pin 26 is driven through the lower eyes 15 on bar 11 into the ground. The bar 20 is then secured with its upper hooked end in eye 24 of bar 10 and with its horizontal lower branch onto the ground.

The next fence section is then attached to the first section by the engagement of its hooks 14 with the eyes 16 of the first section, and bar 19 is secured with its upper hooked end 21 in eye 23 while its lower horizontal branch is placed on the ground side by side of the branch of bar 20. The clamp nails 25 are driven into the ground to clamp with their head parts over the horizontal branches of bars 19 and 20, whereafter the spikes 26 are driven through eyes 16 into the ground until their heads rest on top of eyes 15 and 16.

The following sections of the fence are attached to the second and to each other by simply engaging the hooks of one section with the eyes of the adjoining section and by driving the spikes 17 through eyes 15 and 16 into the ground, until their heads 18 rest upon the eyes.

Changes may be made in the general arrangement of our device and the construction of the minor details thereof without departing from the scope and spirit of our invention.

What we claim as new and desire to secure by Letters Patent of the United States, is:

1. A fence composed of a plurality of sections, each of said sections, comprising two end bars, hooks at the outer ends of one end bar of one section and eyes at the upper end of the end bar of the next section adapted to be engaged by said hooks, clamps for clamping one end section to a post, means for bracing the post against the ground, means for securing the adjoining ends of two fence sections to the ground, and angle irons hooked to said fence sections and engaging the ground with their horizontal branches on some of said sections, means for securing said horizontal sections to the ground, and nails passed through eyes at the lower end of two adjoining fence sections, into the ground to secure said fence to the ground.

2. A fence composed of a plurality of sections, each carrying two vertical end bars, wire stretched between said bars, swivel hooks at the outer ends of one bar, swivel eyes at the outer face of the adjoining bar adapted to be engaged by said hooks, eyes near the lower ends of the end bars of two adjoining sections, pins driven through said eyes into the ground and heads on said pins resting on the upper of said eyes, means for securing some of said sections to a fence post and additional means for securing a predetermined number of sections to the ground.

3. A fence comprising a plurality of sections hingedly secured to each other for relative movement, a means for securing the end sections to a fence post, angle irons adapted to be fastened with the upper hook ends to the end bars of two adjoining sections and having their horizontal branches disposed parallelly on the ground, clamp pins for clamping the horizontal branches to the ground and auxiliary fence nails engaging eyes of the end bars of each section and the ground for securing said sections to the ground.

In testimony whereof we have affixed our signatures.

IOAKIM M. SEMENOFF.
NYKOLA GURNICKI.